Patented Dec. 27, 1927.

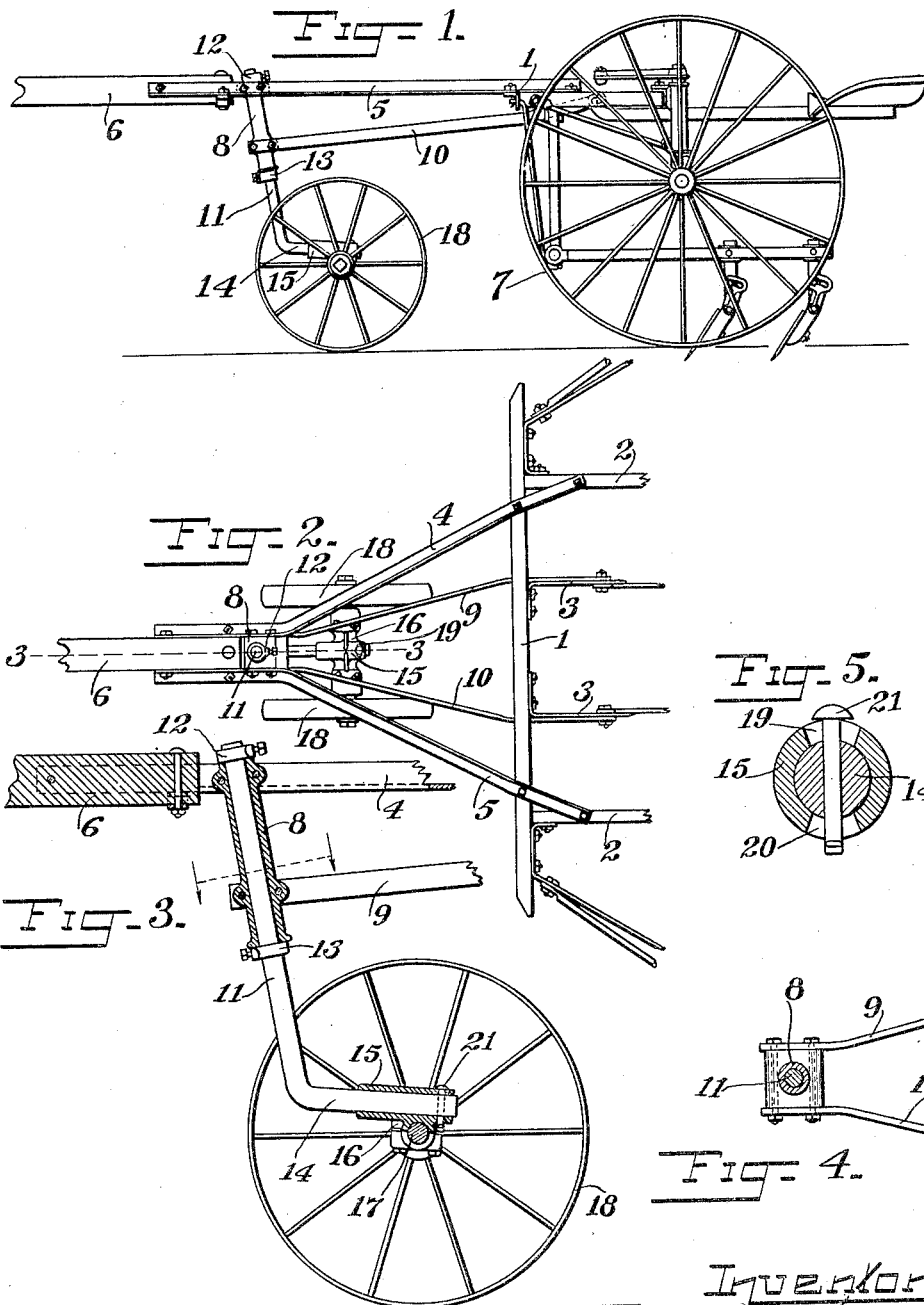

1,653,673

UNITED STATES PATENT OFFICE.

WALTER H. SILVER, OF MOLINE, ILLINOIS, ASSIGNOR TO DEERE & COMPANY, OF MOLINE, ILLINOIS, A CORPORATION OF ILLINOIS.

TONGUE SUPPORT.

Application filed September 19, 1921, Serial No. 501,687. Renewed June 1, 1926.

My invention relates to tongue supports, particularly as applied to cultivators or other vehicles, and has for its object to provide a wheeled support having preferably a pair of caster-wheels, normally in parallelism with the line of draft, freely castering, and which when deflected from the line of draft by inequalities of the soil, will quickly return to their normal position. Other objects being disclosed in the following specification.

Referring to the drawings in which similar numerals indicate identical parts.

Figure 1 is a side elevation of a cultivator, as much of the latter being shown as thought necessary to illustrate the application of my invention. Figure 2 is a plan view in part of Figure 1. Figure 3 is a detail section on the line 3—3 of Figure 2. Figure 4 is a detail of the bracing of the wheel support bearing, and Figure 5 an enlarged sectional detail of part of the caster wheel mounting.

The cultivator frame shown is of a well known type and includes a front transverse bar 1 and longitudinal bars 2 and 3. Secured to the frame, and converging forwardly, are draft bars 4 and 5 and between their forward ends is rigidly bolted a tongue 6. The frame is supported on ground wheels 7, only one of which is shown. Rearward of the tongue 6 and between the bars 4 and 5, to which it is rigidly bolted, is a bearing member or sleeve 8 having its axis inclined fore and aft, said sleeve extending downwardly and rearwardly from the frame and being non-rotatively held in position by braces 9 and 10 secured to the sleeve 8. The frame, tongue and sleeve 8 constitute a body portion which is supported by a caster wheel support that will now be described. Journaled in the sleeve 8 coaxially therewith, so that it turns about an axis inclined fore and aft, is a spindle 11 held from movement longitudinally of the sleeve 8 by a collar 12 on the upper end of the spindle, above the sleeve 8, and a similar collar 13 on the spindle below the sleeve 8, both collars being firmly held in place by set screws or the like. At the lower end of the spindle 8 is a rearwardly extending member in the form of an arm 14 that extends rearwardly at an obtuse angle to the axis of the spindle and rockably supported thereon is a sleeve 15, preferably integral with a box 16, in which is mounted a transverse axle 17 carrying on its ends caster wheels 18 which are sufficiently far apart to straddle a ridge or row of growing plants. The axle 17 may therefore rock vertically about the arm 14 as an axis. In the upper side of the rear end of the sleeve 15 is a transverse slot 19, and a similar slot 20 is provided in the lower side of the sleeve; through the slots 19 and 20 and through the arm is inserted a pin 21 to hold the parts together, the slots 19 and 20 permitting a limited rocking movement of the sleeve 15 on the arm 14 so that the wheels 18 will freely follow the ground surface.

As shown and described the spindle 11 is declined rearwardly from its upper end to the bend of the arm 14, or in other words, it is inclined fore and aft, and the caster wheels are carried at the rear end of the latter, which is at an obtuse angle to the spindle proper, as above stated, and normally extends horizontally to the rear in parallelism with the line of draft. By this construction it will be apparent that the drag of the draft is always exerted to cause the caster wheels to retain their parallelism with the line of draft or to return to it when, because of roughness of the ground surface or other reasons, the arm 14 is swung laterally from its normal position, since when that occurs the rear end of said arm will be caused to assume a downwardly inclined position owing to the fact that it is at an obtuse angle to the spindle 11 or the longitudinal axis of the sleeve 8, thereby moving the pivotal support of the axle 17 downward and causing the caster wheel or wheels to press down on the ground. This relative movement of the caster wheel or wheels away from the body or frame tends to lift the frame and therefore the weight of the front portion of the frame and the rear portion of the tongue tends to resist such lateral swinging of the arm 14 and to return it to its normal trailing position in parallelism with the line of draft. At the same time the caster wheels are free to follow a turn, the spindle 11 freely rotating in the sleeve 8, and also capable of rocking laterally to follow inequalities of the ground.

In supports of this class, as heretofore constructed, the spindle 11 is perpendicular, consequently the caster wheels, when deflected from a straight course, are liable to be thrown at a right angle to the line of advance, retarding the speed of travel and at the same time tending to steer the cultivator or other vehicle to which they are attached out of the desired line of travel. With my device however these undesirable features are absent and a complete and desirable flexibility exists between the support and the tongue to which it is attached. While my improved wheeled support is intended primarily for use in connection with cultivators it may be used with other implements in which it is desirable to provide means for supporting the front portion of a wheeled frame or the rear portion of a tongue. Also while I have shown and described my invention as embodied in a caster wheel structure having two wheels, as that construction possesses advantages over a single wheel construction, it may be embodied also in a structure having only a single caster wheel. The claims hereinafter made are, therefore, to be construed accordingly.

What I claim is—

1. The combination with a wheeled body comprising a frame and draft connections, of a caster wheel support for said body comprising a member pivotally connected with the body to trail normally in parallelism with the line of draft and to swing laterally from its normal position, and a wheel carried by said member and movable downward relatively to the body by lateral swinging of said member away from its normal position to apply upward pressure to the body through said member.

2. The combination with a wheeled body comprising a frame and draft connections, of a caster wheel support for said body comprising a member pivotally connected with the body to turn about a downwardly and rearwardly inclined axis, and having a rearwardly extending support adapted to trail normally in parallelism with the line of draft, and a wheel carried by said support and movable, relatively, downward away from the body by lateral swinging of said support away from its normal position.

3. The combination with a wheeled body comprising a frame and draft connections, of a caster wheel support for said body comprising a member pivotally connected with the body to turn about a downwardly and rearwardly inclined axis, and having a rearwardly extending support adapted to trail normally in parallelism with the line of draft, an axle pivotally mounted on said support to swing vertically and bodily movable, relatively, downward away from the body by lateral swinging of said support away from its normal position, and caster wheels mounted on said axle.

4. The combination with a wheeled body comprising a frame, draft connections, and a bearing member having its axis inclined downwardly and rearwardly, of a spindle supporting the frame and supported by said bearing member to turn coaxially therewith, an extension at the lower end of said spindle extending rearwardly at an obtuse angle to the axis thereof, and a wheel mounted on said extension and movable, relatively, downward away from the body by lateral swinging of said extension away from its normal position.

5. The combination with a wheeled body comprising a frame, draft connections, and a bearing member having its axis inclined fore and aft, of a spindle supporting the frame and supported by said bearing member to turn coaxially therewith, an extension at the lower end of said spindle extending rearwardly at an obtuse angle to the axis thereof, a transverse member mounted on said extension to rock vertically, and wheels carried by said transverse member at opposite sides of said spindle.

6. The combination with a wheeled body comprising a frame, draft connections, and a sleeve having its axis inclined fore and aft, of a spindle journaled in said sleeve and supporting the frame, an extension at the lower end of said spindle normally extending substantially horizontally rearwardly in parallelism with the line of draft, a transverse member mounted on said extension to rock vertically, and wheels carried by said transverse member at opposite sides of said spindle.

7. The combination with a wheeled body having a tongue, of a support therefor including a sleeve rigidly secured on the tongue and extending downwardly and rearwardly, a spindle rotatably journaled in said sleeve, a collar secured on the upper end of said spindle above the sleeve, a collar secured on the spindle intermediate the length of the latter and in contact with the lower end of said sleeve, the lower portion of said spindle bent to extend rearwardly and having a transverse axle supported thereon, and a wheel on each end of said axle.

WALTER H. SILVER.